April 13, 1926.

G. A. CHEETHAM 1,580,408

ELECTRICAL MEASURING INSTRUMENT

Filed May 18, 1918    2 Sheets-Sheet 1

WITNESSES:
Ed. V. Henson
J. H. Proctor

INVENTOR
George Arthur Cheetham
BY
Wesley G. Carr
ATTORNEY

April 13, 1926.
G. A. CHEETHAM
1,580,408
ELECTRICAL MEASURING INSTRUMENT
Filed May 18, 1918   2 Sheets-Sheet 2

WITNESSES:
Ed. V Herm
JA Procter

INVENTOR
George Arthur Cheetham
BY
Wesley G. Carr
ATTORNEY

Patented Apr. 13, 1926.

1,580,408

UNITED STATES PATENT OFFICE.

GEORGE ARTHUR CHEETHAM, OF MANCHESTER, ENGLAND, ASSIGNOR TO WESTINGHOUSE ELECTRIC AND MANUFACTURING COMPANY, A CORPORATION OF PENNSYLVANIA.

ELECTRICAL MEASURING INSTRUMENT.

Application filed May 18, 1918. Serial No. 235,309.

*To all whom it may concern:*

Be it known that I, GEORGE ARTHUR CHEETHAM, a subject of the King of Great Britain, and a resident of Manchester, in the county of Lancaster, England, have invented a new and useful Improvement Relating to Electrical Measuring Instruments, of which the following is a specification.

This invention relates to electrical measuring instruments and has for its object to provide improved apparatus whereby the idle or reactive component of the volt-amperes or the time integral of this quantity may be measured in three-phase electric current distribution systems. From the combination of the reactive component of the power with the rate of energy or true power flowing in the circuit the volt-amperes can be obtained and in a similar manner the latter quantity or reactive component of energy can be combined with the energy expended in the circuit to obtain the time integral of the volt-ampere product or volt-ampere hours. In the latter case, some method of obtaining a positive registration of the time integral of the idle or reactive component irrespective of its sign becomes necessary to obtain accurate values of the volt-ampere integral, as in a circuit where the voltage leads the current in phase the idle component has the opposite sign to that which it has when a current leads the voltage. Measuring instruments have previously been designed and methods of connecting wattmeters of ordinary type to the circuit have been proposed by which the measurement of the above-mentioned quantities may be obtained. The present invention relates to an improved arrangement for the purpose in which a two-element wattmeter or two wattmeters of ordinary type are used as hereinafter explained. Where the time integral of the quantity is required, watthour-meters are employed instead of wattmeters.

Figure 1:
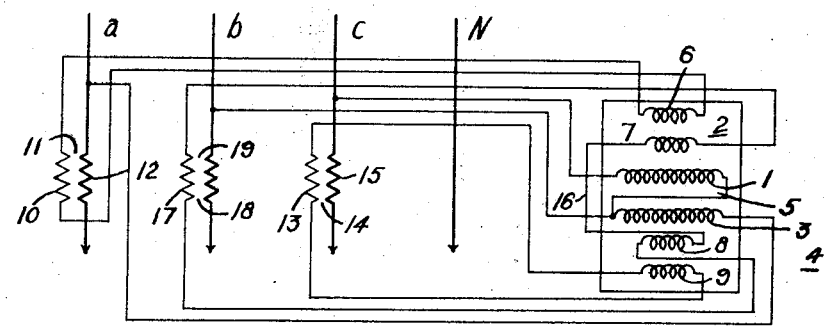
Figure 3:
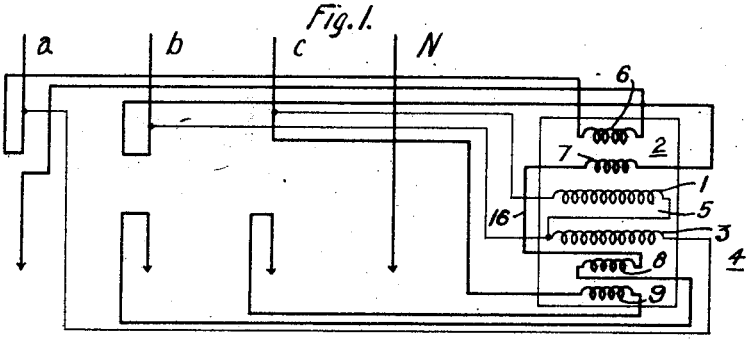
Figure 4:
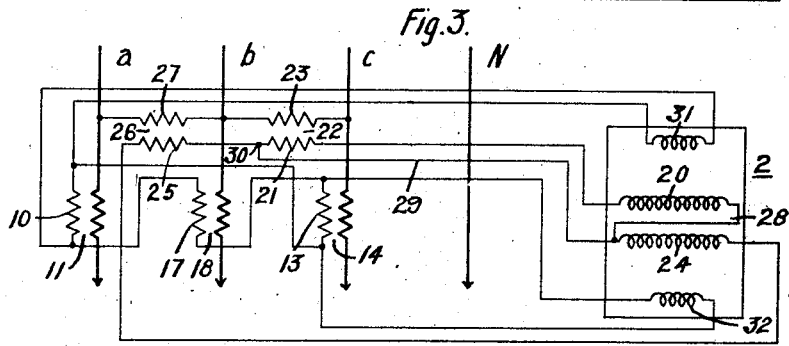
Figure 2:
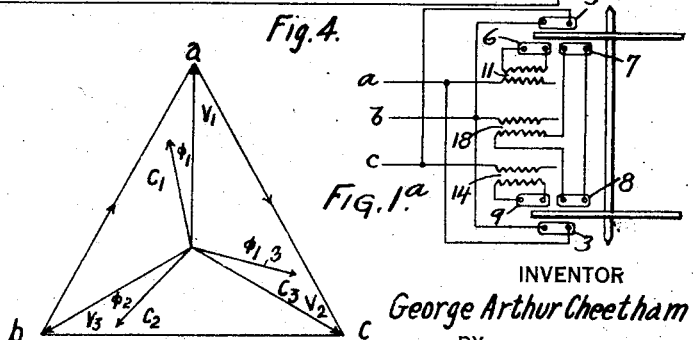
Figure 5:
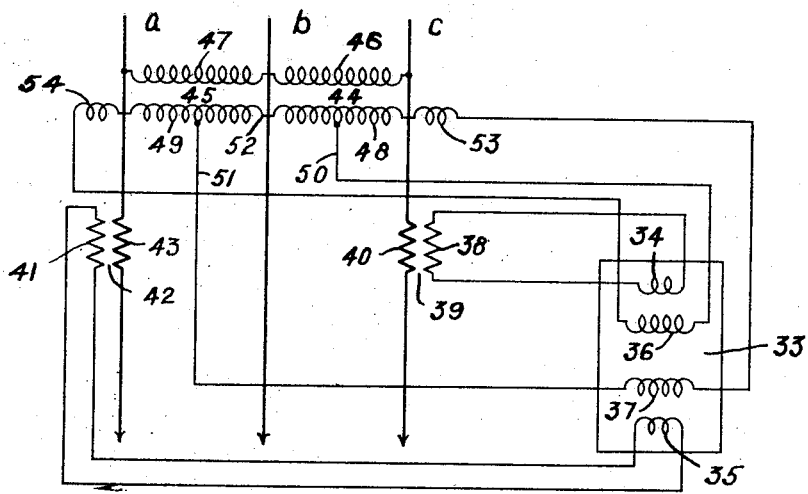
Figure 7:
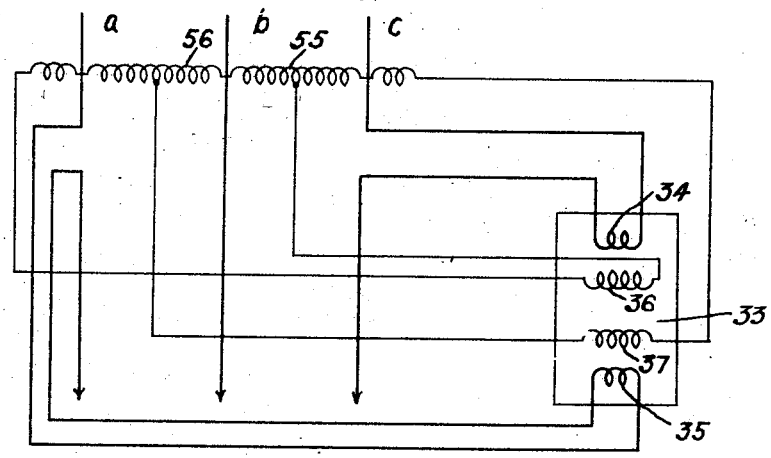
Figure 6:
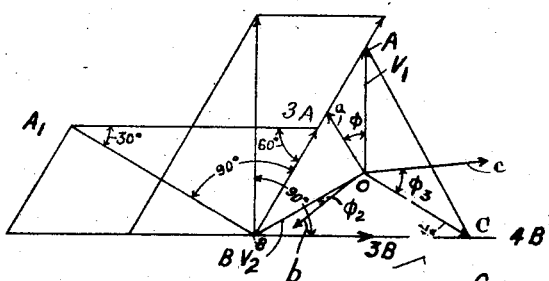

In the accompanying drawings Fig. 1 is an electrical diagram showing the invention as applied to a four-wire, three-phase system of distribution and Fig. 2 is a vector diagram illustrating the same. Fig. 1ᵃ is a view showing the general mechanical arrangement of the invention as illustrated diagrammatically in Fig. 1. Figs. 3 and 4 are electrical diagrams illustrating modifications. Fig. 5 is an electrical diagram showing the invention applied to a three-wire, three-phase system of distribution, and Fig. 6 is a vector diagram illustrating the same. Fig. 7 is an electrical diagram illustrating a modification of the arrangement shown in Fig. 5.

Referring now to Fig. 1, the phase wires of the circuit are indicated by the letters $a$, $b$ and $c$, and the neutral conductor by N. The voltage coil 1 of the meter element or meter 2 is connected between the conductors $b$ and $c$, and the voltage coil 3 of the meter element or meter 4 is connected between the conductors $a$, $b$ as shown. Said coils may have a common terminal joined by a conductor 5 which is connected to the conductor $b$. Said voltage coils 1 and 3 are provided with the same number of turns and are similarly situated in relation to the respective movable elements of the meters 2 and 4. The series coils are indicated at 6, 7, 8 and 9, and all have the same number of turns and are similarly situated in relation to the movable elements of the respective meters. The series coil 6 is connected to the secondary winding 10 of a transformer 11 the primary winding 12 of which is included in series with the conductor $a$, and the series coil 9 of the other meter element is connected in a similar manner to the terminals of the secondary winding 13 of the transformer 14 the primary winding 15 of which is included in series with the conductor $c$. The other series coils 7 and 8 of the two meter elements are connected in series by the conductor 16 and their free terminals are connected to the secondary winding 17 of a transformer 18 the primary winding 19 of which is included in series with the conductor $b$.

The relationship of the voltages and currents circulating in the various meter coils are shown in the vector diagram Fig. 2 in which $C_1$, $C_2$ and $C_3$ represent the respective currents in the secondaries of the current transformers 11, 18 and 14, respectively and $ba$ and $cb$ represent the voltages across the conductors $b$ and $a$, and $c$ and $b$. In one element of the wattmeter, $C_1$ and $-C_2$ are combined with $cb$ and in the other element $C_3$ and $-C_2$ are combined with $ba$.

$v_1$, $v_2$ and $v_3$ represent the voltages between each phase and the neutral point and the currents $C_1$, $C_2$ and $C_3$ differ in phase from these voltages by the respective angles $\phi_1$, $\phi_2$ and $\phi_3$. The torque of the wattmeter is therefore proportional to $$cb\{c_1 \cos(90° - \phi_1) + c_2 \cos(150° - \phi_2)\} + ba\{c_3 \cos(90° - \phi_3) + c_2 \cos(30° - \phi_2)\} =$$
$$cb\left\{c_1 \sin \phi_1 + c_2\left(-\frac{\sqrt{3}}{2} \cos \phi_2 + \frac{\sin \phi_2}{2}\right)\right\} + ba\left\{c_3 \sin \phi_2 + c_2\left(\frac{\sqrt{3}}{2} \cos \phi_2 + \frac{\sin \phi_2}{2}\right)\right\}$$

and since $bc = ba = v$ the voltage between phases and $v_1 = v_2 = v_3 = V$ the voltage between any phase and the neutral point, the above expression is:—

$$V(c_1 \sin \phi_1 + c_2 \sin \phi_2 + c_3 \sin \phi_3)$$

but $$V = \sqrt{3}v$$

∴ the torque is proportional to $$\sqrt{3}v(c_1 \sin \phi_1 + c_2 \sin \phi_2 + c_3 \sin \phi_3)$$

and hence to $$C_1 v \sin \phi_1 + C_2 v \sin \phi_2 + C_3 v \sin \phi_3$$

which is the idle or reactive component of the volt-ampere product or apparent power traversing the circuit.

From this analysis it is seen that the algebraic sum of the torques of the two elements or the two meters 2 and 4 will be proportional to the idle or reactive component of the voltampere product of the energy supplied to the circuit independent of power factor and unbalanced load conditions.

In the modification shown in Fig. 3, the same reference letters and numerals are applied to the same parts as in Fig. 1, but the transformers 11, 18 and 14 are omitted and series coils 6, 7, 8 and 9 of the meters or meter elements are connected directly in series with the conductors $a$, $b$ and $c$. This modification may be employed when the currents flowing in the conductors are not heavy enough to damage the meter windings. In other cases the transformers as shown in Fig. 1 will be used.

Fig. 4 illustrates a further modification in which the meter winding is further simplified and the voltage coils are supplied with energy from voltage transformers so that it may usefully be employed when the voltage between the phases is comparatively high. The voltage coil 20 of the meter element 2 is connected to the terminals of the secondary winding 21 of a transformer 22 the primary winding 23 of which is connected across the conductors $b$ and $c$, and the voltage coil 24 of the meter element 4 is connected in a similar manner to the secondary winding 25 of a transformer 26 the primary winding 27 of which is connected across the conductors $a$ and $b$, as shown. Opposite terminals of the voltage coils 20 and 24 may be connected together by a conductor 28 and to a single conductor 29, the latter being connected to a point 30 to adjacent terminals of the secondary windings 21 and 25. The meter elements are respectively provided with current coils 31 and 32, coil 31 being connected to the terminals of the secondary winding 10 of the transformer 11 and to the terminals of the two secondary windings 13 and 17 of the transformers 14 and 18 which are connected in series. The current coil 32 is connected to the terminals of the secondary winding 13 of the transformer 14 and to the terminals of the secondary windings 10 and 17 which are connected in series. In other words, the secondary windings 10, 17 and 13 are connected in delta, and current coil 31 is connected to the terminals of the winding 10 and the current coil 32 is connected to the terminals of the winding 13. Obviously the coils 31 and 32 may be provided with a common terminal which is connected to the common terminal of the windings 10 and 13.

It will be evident that the current which in the arrangement shown in Fig. 1 passed through the current coils 7 and 8 will now be superimposed upon the current traversing the coils 6 and 9 which correspond to the coils 31 and 32 of Fig. 4. The vector analysis hereinabove given with reference to Fig. 2 is clearly applicable to the arrangements shown in Fig. 4.

Referring now to Fig. 5 which illustrates the invention as applied to a three-conductor three-phase system, 33 is a two-element polyphase wattmeter or watthour meter of a similar description to that shown in Fig. 4, for example, having current coils 34 and 35 and voltage coils 36 and 37, corresponding to the two meter elements. The current coil 34 is connected to the terminals of the secondary winding 38 of a transformer 39 the primary winding 40 of which is included in series with the conductor $c$ and the current coil 35 is connected to the terminals of the secondary winding 41 of a transformer 42, the primary winding 43 of which is included in series with the conductor $a$. Two potential transformers 44 and 45, have their primary windings 46 and 47 connected respectively across the conductors $c$ and $b$, and $a$ and $b$; the secondary windings 48 and 49 of said transformers are connected in series and are provided with the internal taps 50 and 51, in order that, if V is the normal secondary voltage of the transformers and also of the meters or meter elements to be used the voltage between the common point 52 of the secondary windings 48 and 49 and either of the taps 50 and 51 is equal to $V/\sqrt{3}$, and between the common point 52 and the other terminals 53 and 54 of the secondary windings is equal to $2V/\sqrt{3}$.

The voltage coil 36 of one meter element is connected to the points 50 and 54, and the voltage coil 37 of the other meter element is connected to the points 51 and 53. The vector diagram Fig. 6 shows the current and voltage relations existing in the arrangement shown in Fig. 5, O$a$, O$b$, and O$c$ representing the currents in the conductors $a$, $b$ and $c$, and BA and BC the normal secondary voltages V of the potential transformers 45 and 44. The voltage applied to the coil 37 which combined with the current O$a$ in coil 35 (through the transformer 42) to produce a torque in the instrument, is the algebraic sum of the potential differences of the points 52 and 51 and 52 and 53 respectively and is obtained by adding the vectors B3A and −B4B, the resultant of which is BA$_1$.

Since B3A = $V/\sqrt{3}$ and B4B = $2V/\sqrt{3}$ and and because angle A$_1$3AB = 60° the angle between BA and BA$_1$ = 90° and $$BA_1 = \sqrt{\left(\frac{2V}{\sqrt{3}}\right)^2 - \left(\frac{V}{\sqrt{3}}\right)^2} = V.$$

Similarly the voltage combining with the current O$c$ (through the transformer 39) is equal to V and lags 90° behind B$c$. Let O$a$, O$b$ and O$c$ = C$_1$, C$_2$, and C$_3$ respectively. The torque on the wattmeter is, therefore, proportional to $VC_1 \cos (60° - \phi_1) + VC_3 \cos (120° - \phi_3)$
$= VC_1 \sin (30° + \phi_1) + VC_3 \sin (\phi_3 - 30°)$ but V sin (30° + $\phi_1$) is the vertical component of BA relative to C$_1$ and this is equal to the sum of the vertical components of $v_1$ and $-v_2$ relative to C$_1$, since BA is the resultant of these two vectors. Similarly V sin ($\phi_3$ − 30°) is the sum of the vertical components of $v_3$ and $-v_2$ relative to C$_3$. Hence the torque is proportional to $V_1C_1 \sin \phi_1 + V_2C_1 \sin (60° + \phi_1) +$
$\quad V_3C_3 \sin \phi_3 + V_2C_3 \sin (\phi_3 - 60°)$ but $C_1 \sin (60° + \phi_1)$ is the vertical component of −C$_1$ relative to $v_2$ and C$_3$ sin ($\phi_3$ − 60°) is the vertical component of −C$_3$ relative to $v^2$ hence their sum is the vertical component of the resultant of −C$_1$ and −C$_3$ relative to $v_2$, but this resultant is C$_2$ therefore the torque is proportional to $V_1C_1 \sin \phi_1 + V_2C_2 \sin \phi_2 + V_3C_3 \sin \phi_3$ which is the total idle component and is independent of power factor or unbalanced load conditions.

Fig. 7 shows an arrangement similar to Fig. 5 but the transformers 44 and 45 are replaced by auto-transformers 55 and 56, the voltage windings 34 and 35 being respectively connected to appropriate taps corresponding to the points 50, 51, 53 and 54 of the diagram Fig. 5 and the current transformers 39 and 42 are omitted in order that the current coils 34 and 35 of the wattmeter elements or meters may be included directly in series with the conductors $a$ and $c$.

The relationship of the currents and voltages in this arrangement is substantially the same as hereinabove described with reference to Fig. 5 and no further description will be necessary to enable it to be understood by persons skilled in the art.

It will be understood that the meter elements employed may be of any suitable induction type and that either two-element polyphase wattmeters or watthour meters may be used as indicated in the diagram, or single-phase meters may be employed and the indications or registrations combined algebraically.

I claim as my invention:—

1. In a measuring instrument for a multi-phase circuit, the combination with a meter having a voltage element connected between two conductors of the circuit and a current element connected differentially between one of said conductors and the third conductor of the circuit, of a second meter having a voltage element connected between one of said two conductors and said third conductor and a current element connected differentially between the second and first conductors.

2. A measuring instrument for a multi-phase circuit comprising a meter having a voltage element connected between two conductors of the circuit and a current element connected to a third conductor of the circuit, a second meter having a voltage element connected between the second and third conductors of the circuit and a current element connected to the first conductor of the circuit, said voltage elements being connected in open-delta relation, and series-related current elements each operating differentially with one of said first current elements and connected to the second conductor of the circuit.

3. An instrument for measuring the reactive component of the apparent power of a three-phase circuit comprising two wattmeter elements and means for energizing one element in accordance with the product of the voltage between two conductors and the difference between the current traversing one of the two conductors and the current traversing the third conductor of the circuit, and for energizing the other wattmeter element in accordance with the product of the voltage between one of the said two conductors and the said third conductor, and the difference between the currents respectively traversing the second of the said two conductors and the first conductor.

In testimony whereof, I have hereunto subscribed my name this 12th day of April 1918.

GEORGE ARTHUR CHEETHAM.